3,457,199
IMPROVED UREA-FORMALDEHYDE FOAMS
Rodney L. Wells, Chester, and Alexander Sadle, Petersburg, Va., assignors to Allied Chemical Corporation, New York, N.Y., a corporation of New York
No Drawing. Filed Dec. 8, 1965, Ser. No. 512,551
Int. Cl. C08g *53/08, 51/04*
U.S. Cl. 260—2.5                                    5 Claims

ABSTRACT OF THE DISCLOSURE

Incorporating a particulate alkaline earth carbonate into urea-formaldehyde foam neutralizes residual acid in the foam after curing of the foam is substantially complete. The neutralized foam has excellent stability.

---

This invention relates to improvements in urea-formaldehyde foam compositions; and more particularly to the stabilization of urea-formaldehyde foam compositions.

Foamed items from urea-formaldehyde resins are prepared by a variety of methods from aqueous solutions containing a urea-formaldehyde partial condensate. The resin is solidified by curing with an acid solution. Solid foams prepared from the curing action of the acid upon the urea-formaldehyde resin, are useful for many purposes, including insulation of building structures, in which the foam can be either prefabricated, or prepared on location and be directed after a partial cure directly into wall-, ceiling-, and floor spaces.

It has been observed that a considerable period after the preparation and curing or urea-formaldehyde foams, the hardened foam becomes gradually increasingly brittle and crumbles into powder after storage for several years or even months. It has also been observed that the slow decomposition of the foam is accelerated under high humidity and elevated temperature conditions, such as is encountered in the case of attic insulations.

It is an object of the present invention to provide improvements in urea-formaldehyde foam compositions to eliminate the above-identified disadvantages.

In accordance with the process of the invention an effective amount, such as 1–12% by weight, or more, based on urea-formaldehyde solids, of a particulate earth alkali carbonate having a particle size passing through a Tyler screen of a mesh size between 20 and 200, preferably between 100 and 150, and having a solubility less than 0.028 per part water at 25° C., is added to at least one of the ingredients of the foam which is prepared from an aqueous solution of a urea-formaldehyde partial condensate and from a solution of an acid.

Materials useful for carrying out the invention include the carbonates of Ba, Ca, Mg, and Sr, as well as mineral modifications and combinations thereof, such as dolomite ($CaCo_3 \cdot MgCO_3$). The acid-neutralizing agents used in accordance with the present invention are slow-acting neutralizers, which means that in the initial period after resin and curing acid have been brought together, little or no acid will be consumed by the neutralizing additive of the invention, but initially substantially the entire amount of the acid is available for the curing of the resin. The neutralizing effect of the carbonates of the invention starts to manifest itself only well after curing of the resin is substantially completed. This is due to the low solubility as well as the particle size of the earth alkali carbonates.

Experiments have indicated that the inadequate storage stability of prior art urea-formaldehyde resin foams is due to the residual acidity in the foam. The addition of a slow-acting neutralizing agent in accordance with the invention, aids in gradually neutralizing and thus eliminating the residual acidity.

Methods for preparing urea-formaldehyde foams are well known in the art and in the following, one of the preferred methods which utilize the features of the present invention, is described. One such method to which the improvements of the present invention have been added, is described in United States Letters Patent No. 3,186,959, issued June 1, 1965 to Allied Chemical Corporation. According to a preferred process an aqueous urea-formaldehyde solution which contains 1–12%, based on urea-formaldehyde resin solids, of dolomite ground to an average particle size to pass through 100–150 Tyler mesh is injected cocurrently into a stream of an aqueous acidic foam containing a surfactant. The acid in the foam proceeds to cure the urea-formaldehyde resin, and the dolomite dispersed throughout the cured foam proceeds to exert its neutralizing action substantially after the curing has been completed.

While the slow-acting neutralizing agent of the invention can be used in concentrations ranging between 1 and 12%, based on the weight of urea-formaldehyde resin solids, preferably 9% or more of the slow-acting neutralizing agent is used. In the event the slow-acting neutralizing agent is added not to the acid solution but to the resin solution, as is preferred, the addition can be accomplished considerable periods of time before use, since the resin solution does not react with the slow-acting neutralizing agent, except for the negligible solubility of the agent in water. The only requirement is that before use, the slow-acting neutralizing agent which would tend to settle to the bottom, should be uniformly dispersed throughout the resin solution.

In carrying out the process of the invention, any conventional urea-formaldehyde solutions and conventional acidic hardening agents can be used. It is preferred to utilize urea-formaldehyde solutions in which the formaldehyde to urea mol ratio is between about 1.4 and about 2.2. Solids content of the solution is preferably between about 45% and about 65%.

Example 1

A hardener solution containing 95.5% by weight water, 0.5% by weight of 96% sulfuric acid, and 4% by weight of a commercial surfactant containing 80% alkyl aryl sulfonic acid having a pH of 1.5, sold by Allied Chemical Corporation under the trade name Nacconol SZA, was whipped into a foam by bubbling air therethrough. A urea-formaldehyde resin solution prepared in accordance with Part B of the example of United States Letters Patent No. 3,186,959, to which has been added 10%, based on the weight of urea-formaldehyde solids, of dolomite powder having an average particle diameter to pass through a Tyler screen of between 100 and 200 mesh, was mixed with the foam, in a foam to resin weight ratio of 1.0.

Control.—A foam was prepared in accordance with the foregoing, except that no dolomite was added. The dolomite-containing foam body of Example 1, and the dolomite-free foam body of the control sample were stored for one year at room temperature. The dolomite-containing foam remained strong and resilient after one year, whereas the foam containing no dolomite tended to crumble when handled and its surface was visibly deteriorated.

Examples 2–3

Foams were prepared in accordance with Example 1, except that instead of dolomite, 10% each, based on the weight of urea-formaldehyde solids, of magnesium carbonate and calcium carbonate, respectively, were used.

An accelerated aging test was devised to enable evaluation of the advantages of the invention without having to wait for periods as long as a year or more. The results can be obtained with this test within a period of about two weeks. Accordingly, the foam to be tested is cut into 2 x 2 inch cubes, weighed and placed in 400 ml. beakers and placed into an oven at 70° C. and 70% relative humidity. After 15 days the samples are removed from the oven and are placed into a cooling chamber at ambient temperature and humidity for overnight and then the samples are weighed. Subsequently the samples are placed with their most deteriorated side downwards into a transparent polymethylmethacrylate box with no top or bottom and 2 x 2 inch inside dimensions. A polymethylmethacrylate cover weighing 20 grams is placed on top of the foam. The bottom surface of the foam is drawn over an 18-foot section of an aluminum screen (16 mesh) mounted on a horizontal board, at the rate of 3 feet per minute. The sample is weighed again and a percentage weight loss is calculated. Duplicate samples are run and average results are reported. Abrasion loss of fresh foam may also be determined as a control for a more exact measure of weight loss due to the accelerated aging, i.e., abrasion loss at zero aging time can thereby be subtracted from the end results.

The above-described accelerated aging test was carried out on foams prepared in accordance with Example 1–3 and on the foam prepared in accordance with the control sample which was exactly the same but contained no earth alkali carbonate. The abrasion loss data obtained were corrected for the abrasion loss determined on the original sample. The results of the accelerated test, as well as residual foam acidity are:

| Example No. | Foam acidity (Meq. acid per gram) | Avg. abrasion loss (percent) |
|---|---|---|
| 1 | 0.06 | 11 |
| 2 | 0.26 | 18 |
| 3 | 0.19 | 20 |
| Control | 0.34 | 28 |

We claim:

1. A foam composition, comprising a major amount of condensed foamed urea-formaldehyde resin, and an effective amount of dolomite ($CaCO_3 \cdot MgCO_3$) having a maximum solubility of 0.028 per 100 parts water at 25° C. and a particle size to pass through Tyler screens of between 20 and 200 mesh.

2. The foam composition of claim 1, wherein said amount is at least 1% by weight, based on urea-formaldehyde resin solids.

3. In a process for preparing urea-formaldehyde foam from an aqueous solution of urea-formaldehyde partial condensate as one ingredient, and from a solution of an acid as another ingredient, the improvement which comprises adding an effective amount of dolomite ($CaCO_3 \cdot MgCO_3$) having a maximum solubility of 0.028 per 100 parts water at 25° C. and of a particle size passing through Tyler screens of between 20 and 200 mesh, to at least one of the ingredients of the foam.

4. The improvement of the process of claim 3, wherein said amount is at least 1% by weight, based on urea-formaldehyde resin solids.

5. The improvement of the process of claim 4, wherein the average particle size of said dolomite passes through Tyler screens between 100 and 150 mesh, and said amount is between 1% and 12%.

References Cited
UNITED STATES PATENTS 3,138,563  6/1964  Morgan et al.
3,290,260  12/1966  Buccigross.

MURRAY TILLMAN, Primary Examiner
MORTON FOELAK, Assistant Examiner

U.S. Cl. X.R.
260—39, 69, 71